(12) United States Patent
Patil et al.

(10) Patent No.: US 12,030,003 B2
(45) Date of Patent: Jul. 9, 2024

(54) BYPASS VALVE WITH VARIABLE FILTER

(71) Applicant: Deere & Company, Moline, IL (US)

(72) Inventors: Yogesh Patil, Nandurbar (IN); Dattatray B. Pingle, Nashik (IN); Yogesh Bhoi, Nandurbar (IN)

(73) Assignee: Deere &Company, Moline, IL (US)

( * ) Notice: Subject to any disclaimer, the term of this patent is extended or adjusted under 35 U.S.C. 154(b) by 0 days.

(21) Appl. No.: 18/313,006

(22) Filed: May 5, 2023

(65) Prior Publication Data

US 2023/0271119 A1    Aug. 31, 2023

Related U.S. Application Data

(63) Continuation of application No. 17/574,713, filed on Jan. 13, 2022, now Pat. No. 11,724,219.

(51) Int. Cl.
*B01D 35/147*  (2006.01)
*B01D 27/10*   (2006.01)
*F16K 15/06*   (2006.01)

(52) U.S. Cl.
CPC ....... *B01D 35/1475* (2013.01); *B01D 27/103* (2013.01); *F16K 15/063* (2013.01); *B01D 2201/0415* (2013.01); *B01D 2201/291* (2013.01); *B01D 2201/305* (2013.01); *B01D 2201/4084* (2013.01); *Y10T 137/7738* (2015.04); *Y10T 137/7929* (2015.04); *Y10T 137/7932* (2015.04); *Y10T 137/7938* (2015.04); *Y10T 137/87338* (2015.04)

(58) Field of Classification Search
CPC ....... Y10T 137/87338; Y10T 137/7929; Y10T 137/7738; Y10T 137/7932; Y10T 137/7938; B01D 35/1475; B01D 27/103; B01D 2201/0415; B01D 2201/291; F16K 15/063; F16K 15/06
See application file for complete search history.

(56) References Cited

U.S. PATENT DOCUMENTS

| | | |
|---|---|---|
| 3,835,884 A | 9/1974 | Ishikawa |
| 3,898,063 A | 8/1975 | Gazan |
| 4,575,422 A | 3/1986 | Zimmer |
| 4,810,272 A | 3/1989 | Overby |

(Continued)

FOREIGN PATENT DOCUMENTS

| | | |
|---|---|---|
| CN | 2869333 Y | 2/2007 |
| CN | 105545407 A | 5/2016 |

(Continued)

*Primary Examiner* — Daphne M Barry
*Assistant Examiner* — Frederick D Soski
(74) *Attorney, Agent, or Firm* — Tucker Ellis LLP; Heather M. Barnes; Michael G. Craig

(57) ABSTRACT

One or more techniques and/or systems are disclosed for bypass flow filtering. A bypass valve filter includes at least one wall configured to engage a surface of a bypass valve and a filter surface having a plurality of openings between an inside of the at least one wall and an outside of the at least one wall. One or more openings of the plurality of openings have a first size and one or more other openings of the plurality of openings have a second size, wherein the first size is different than the second size to define different levels of filtering. The bypass valve further includes an open end configured to allow fluid flow therethrough and to the plurality of openings.

17 Claims, 13 Drawing Sheets

(56) References Cited

U.S. PATENT DOCUMENTS

| | | | |
|---|---|---|---|
| 5,113,837 A | 5/1992 | Faull | |
| 5,482,080 A | 1/1996 | Bergmann | |
| 6,096,207 A | 8/2000 | Hoffman, Jr. | |
| 6,488,845 B1 | 12/2002 | Neufeld | |
| 6,572,768 B1 | 6/2003 | Cline | |
| 8,118,998 B2 | 2/2012 | Bagci et al. | |
| 9,555,350 B2 | 1/2017 | Ardes | |
| 11,426,686 B1* | 8/2022 | Mormino | B01D 36/001 |
| 11,691,094 B2* | 7/2023 | Moser | B29C 48/694 |
| | | | 210/445 |
| 11,697,945 B2* | 7/2023 | Coelho | C02F 1/001 |
| | | | 210/238 |
| 11,780,747 B2* | 10/2023 | Sauer | C02F 1/283 |
| | | | 210/483 |
| 2003/0106848 A1* | 6/2003 | Oohashi | B01D 27/103 |
| | | | 210/130 |
| 2004/0188346 A1 | 9/2004 | Cline | |
| 2006/0131225 A1 | 6/2006 | Luka | |
| 2013/0327429 A1 | 12/2013 | Ardes | |
| 2016/0059164 A1 | 3/2016 | Plickys | |
| 2016/0166079 A1 | 6/2016 | Tsai | |
| 2017/0165595 A1 | 6/2017 | Klein | |
| 2017/0209821 A1 | 7/2017 | Allot | |
| 2017/0326482 A1 | 11/2017 | Prchai | |
| 2018/0111071 A1* | 4/2018 | Bilski | B01D 27/106 |
| 2019/0211938 A1 | 7/2019 | Hebrard | |
| 2019/0360583 A1 | 11/2019 | Froehlich | |
| 2020/0009483 A1 | 1/2020 | Pichlamier | |
| 2020/0122066 A1 | 4/2020 | Lin | |
| 2020/0261833 A1 | 8/2020 | Bortnik | |
| 2020/0330910 A1 | 10/2020 | Matas | |
| 2020/0384386 A1 | 12/2020 | Jainek | |
| 2021/0008471 A1* | 1/2021 | Moser | B29C 48/503 |
| 2021/0008472 A1 | 1/2021 | Baumann | |
| 2021/0131319 A1 | 5/2021 | Fayolle | |
| 2021/0299597 A1* | 9/2021 | Jedlinski | B01D 29/35 |
| 2021/0322905 A1 | 10/2021 | Abdalia | |
| 2021/0332779 A1 | 10/2021 | Jedlinksi | |
| 2021/0362079 A1* | 11/2021 | Hubbard | B01D 29/114 |
| 2021/0394090 A1* | 12/2021 | Golan | B01D 29/07 |
| 2022/0001315 A1 | 1/2022 | Chantome | |
| 2022/0018271 A1 | 1/2022 | Sander | |
| 2022/0065357 A1 | 3/2022 | Chen | |
| 2022/0074326 A1 | 3/2022 | Stenersen | |
| 2022/0203270 A1 | 6/2022 | Costa | |
| 2022/0203276 A1 | 6/2022 | Costa | |
| 2022/0258077 A1 | 8/2022 | Stehle | |
| 2023/0104919 A1* | 4/2023 | Saedi | B01D 29/21 |
| | | | 210/167.1 |

FOREIGN PATENT DOCUMENTS

| | | |
|---|---|---|
| DE | 102005047822 A1 | 4/2006 |
| DE | 102010054349 A1 | 6/2011 |
| EP | 1199093 A1 | 4/2002 |
| KR | 20130005685 A | 1/2013 |
| WO | 2012110411 A1 | 8/2012 |

* cited by examiner

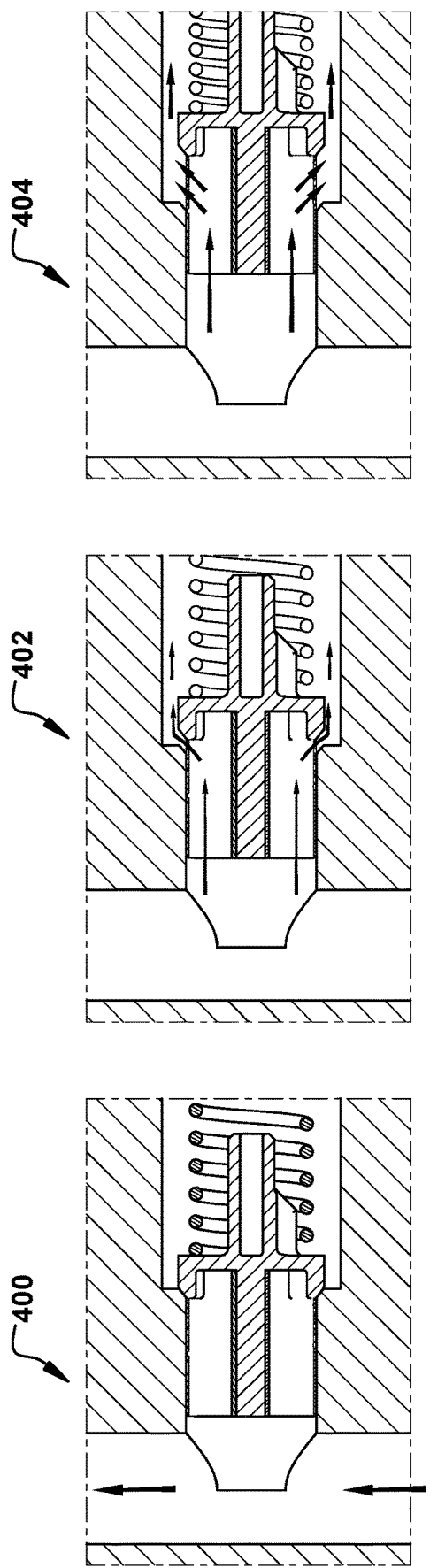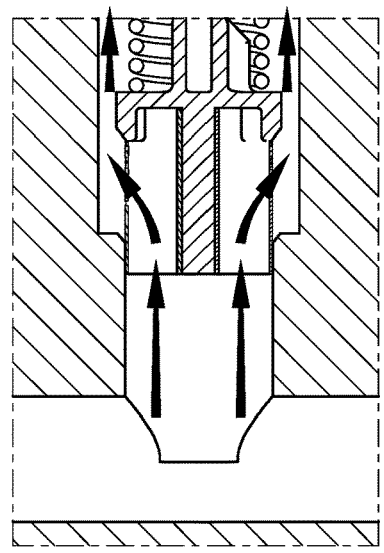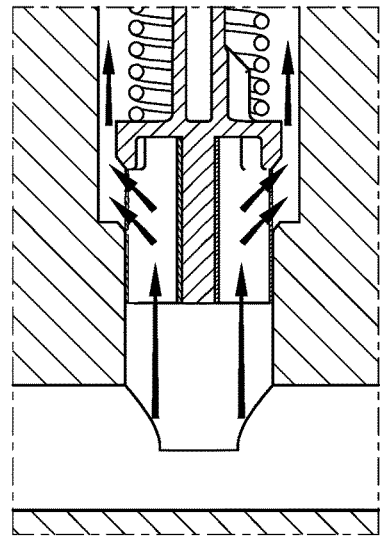
FIG. 10A
FIG. 10B
FIG. 10C
FIG. 10D
FIG. 10E

BYPASS VALVE WITH VARIABLE FILTER

CROSS-REFERENCE TO RELATED APPLICATION

This application is a continuation of U.S. Ser. No. 17/574,713, titled BYPASS VALVE WITH VARIABLE FILTER, filed Jan. 13, 2022, which is incorporated herein by reference.

BACKGROUND

Engine oil filters include a bypass valve, sometimes referred to as a pressure relief valve, that opens, such as when the oil filter becomes clogged with debris or when the oil is too thick. This opening of the bypass valve allows the oil to bypass the filter, which then goes to the engine to prevent engine oil starvation and possible engine damage. However, with the bypass valve open, an unfiltered oil supply with debris is allowed to flow to rotating assemblies of the engine, which can potentially lead to damage to engine components, such as to the balancer shaft, thereby resulting in possible damage to the engine block.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for filtering bypass oil flow through a bypass valve using a variable filter. For example, a variable filter having different filtering levels allows for filtering of otherwise unfiltered oil passing through the bypass valve.

In one implementation, a bypass valve filter includes at least one wall configured to engage a surface of a bypass valve and a filter surface having a plurality of openings between an inside of the at least one wall and an outside of the at least one wall. One or more openings of the plurality of openings have a first size and one or more other openings of the plurality of openings have a second size, wherein the first size is different than the second size to define different levels of filtering. The bypass valve further includes an open end configured to allow fluid flow therethrough to the plurality of openings.

In another implementation, a bypass valve includes a housing defining a bypass flow path and a spring within the housing. The bypass valve further includes a variable filter within the housing, wherein the variable filter has a filter surface with a plurality of rows of openings having different sizes corresponding to different filter levels. The filter surface is outward facing and configured to expose a varying number of the plurality of rows of openings to the bypass flow path based on a pressure applied on the variable filter.

In yet another implementation, a method of filtering oil in a vehicle includes configuring a variable filter to have a filter surface with a plurality of rows of openings having different sizes corresponding to different filter levels. The filter surface is outward facing and configured to expose a varying number of the plurality of rows of openings to the bypass flow path based on a pressure applied on the variable filter. The method further includes positioning the variable filter within a bypass valve for filtering fluid in the vehicle.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The examples disclosed herein may take physical form in certain parts and arrangement of parts, and will be described in detail in this specification and illustrated in the accompanying drawings which form a part hereof and wherein:

FIGS. 10A, 10B, 10C, 10D, and 10E illustrate operation of a bypass valve having a variable filter according an implementation.

DETAILED DESCRIPTION

Figure 1:
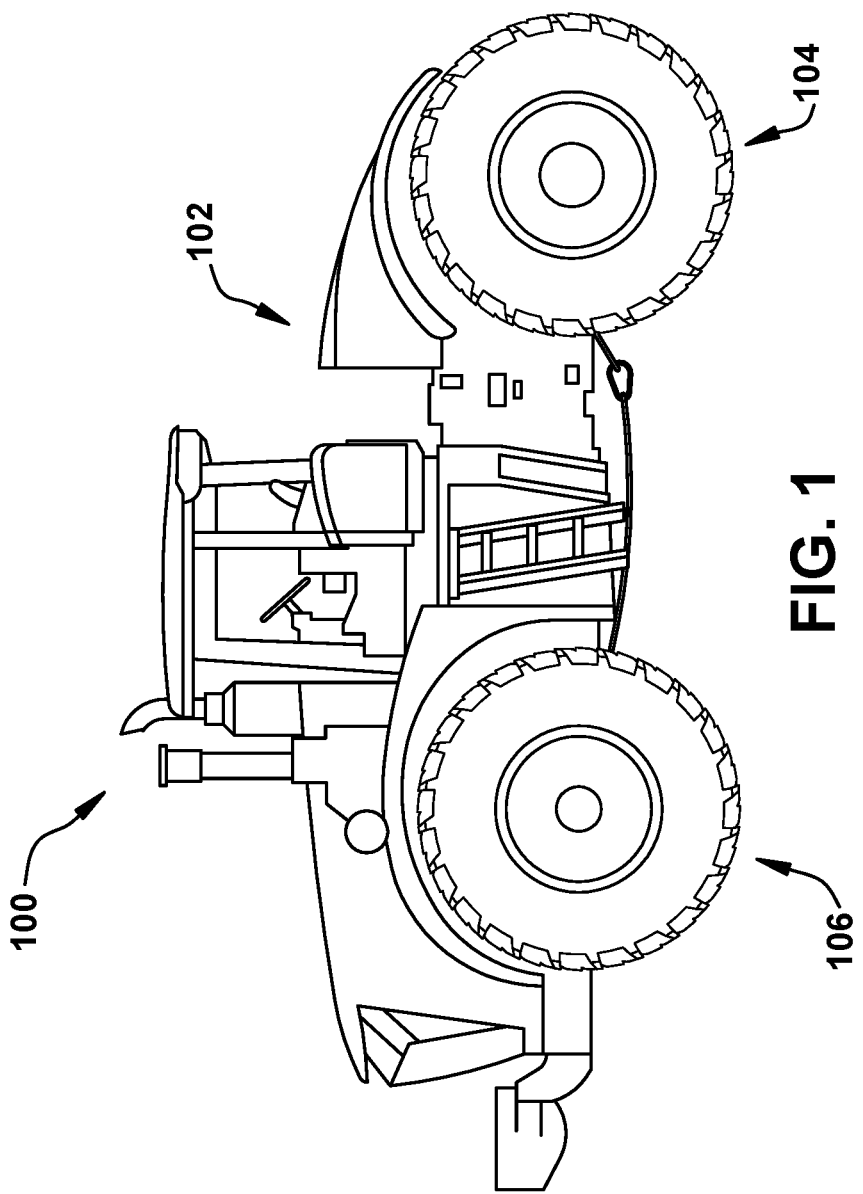
FIG. 1 is a component diagram illustrating an example implementation of a vehicle in which various examples can be implemented.
Figure 2:
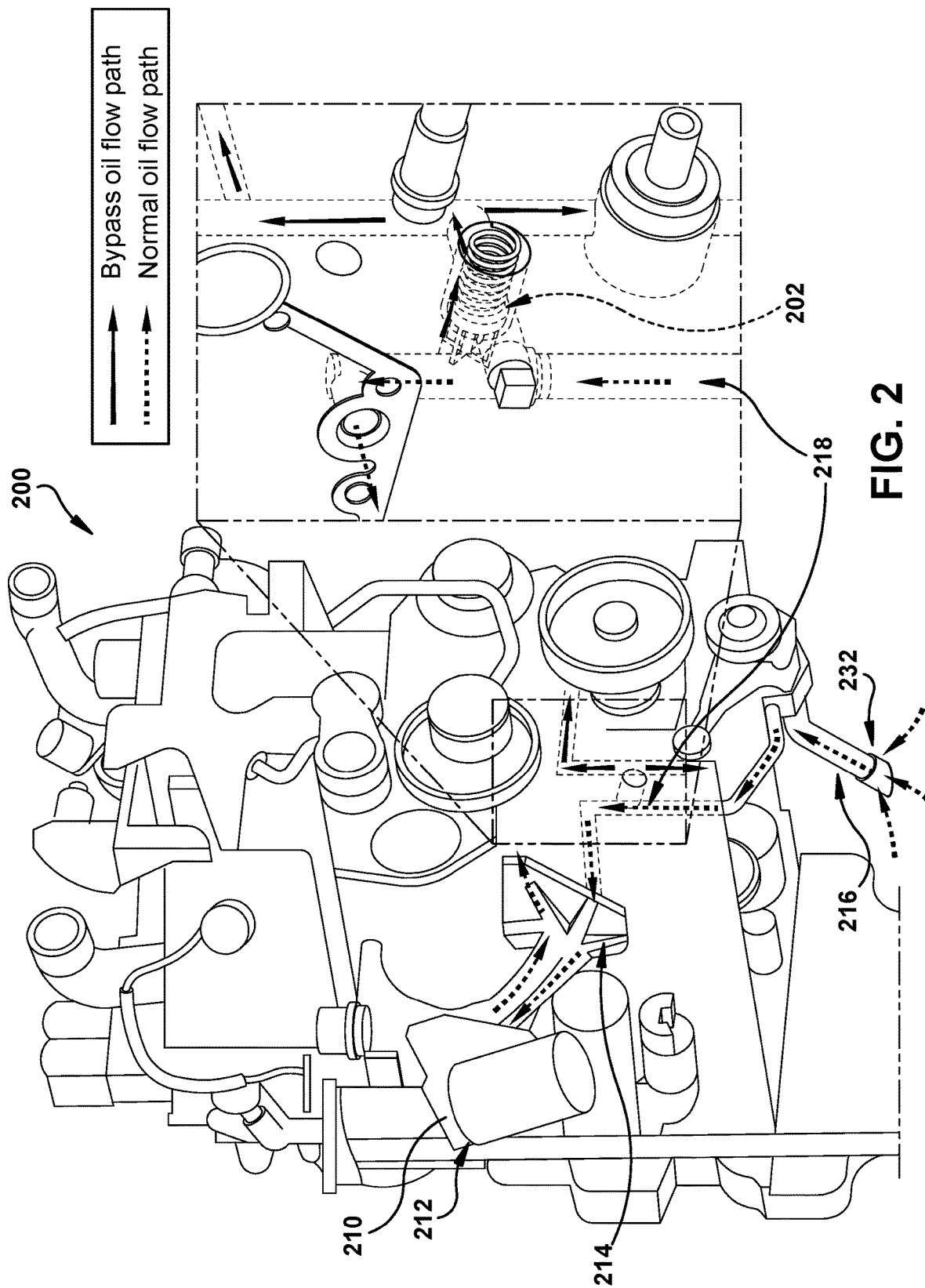
FIG. 2 is a diagram illustrating an example implementation of an engine in which various examples of a bypass valve can be implemented.
Figure 3:
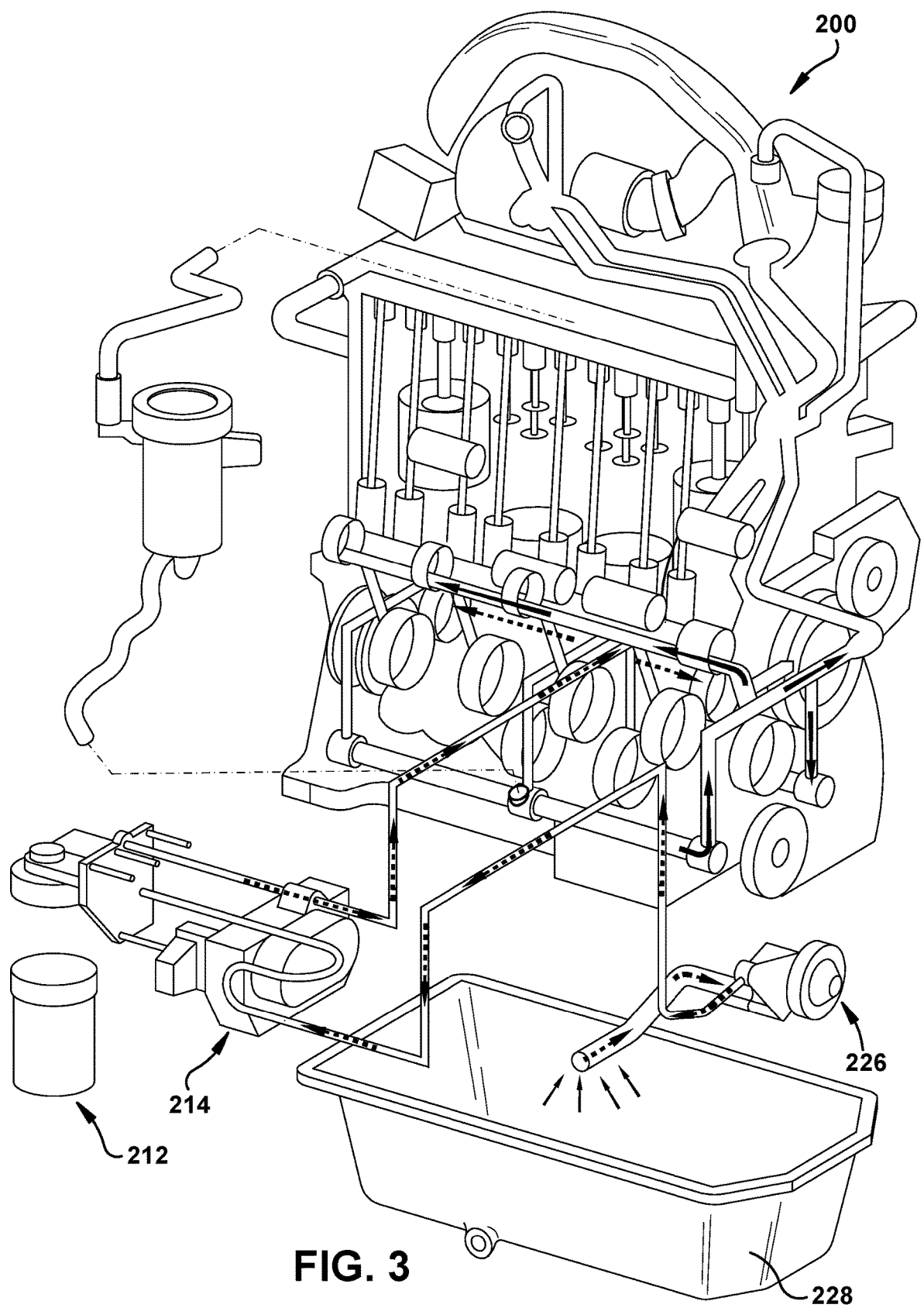
FIG. 3 is an exploded view of an engine in which various examples of a bypass valve can be implemented.
Figure 4:
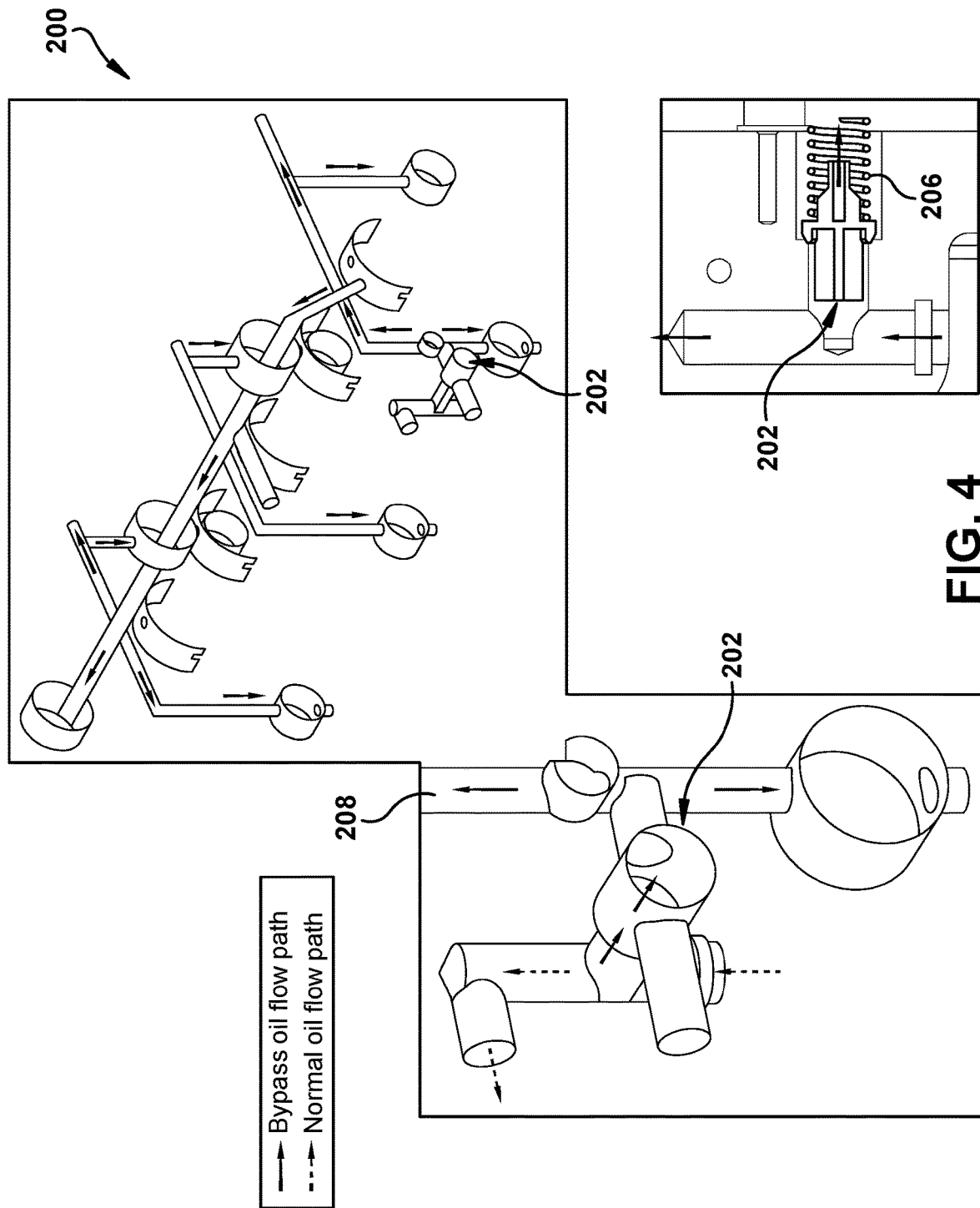
FIG. 4 illustrates different oil flow paths according to an implementation
Figure 5:
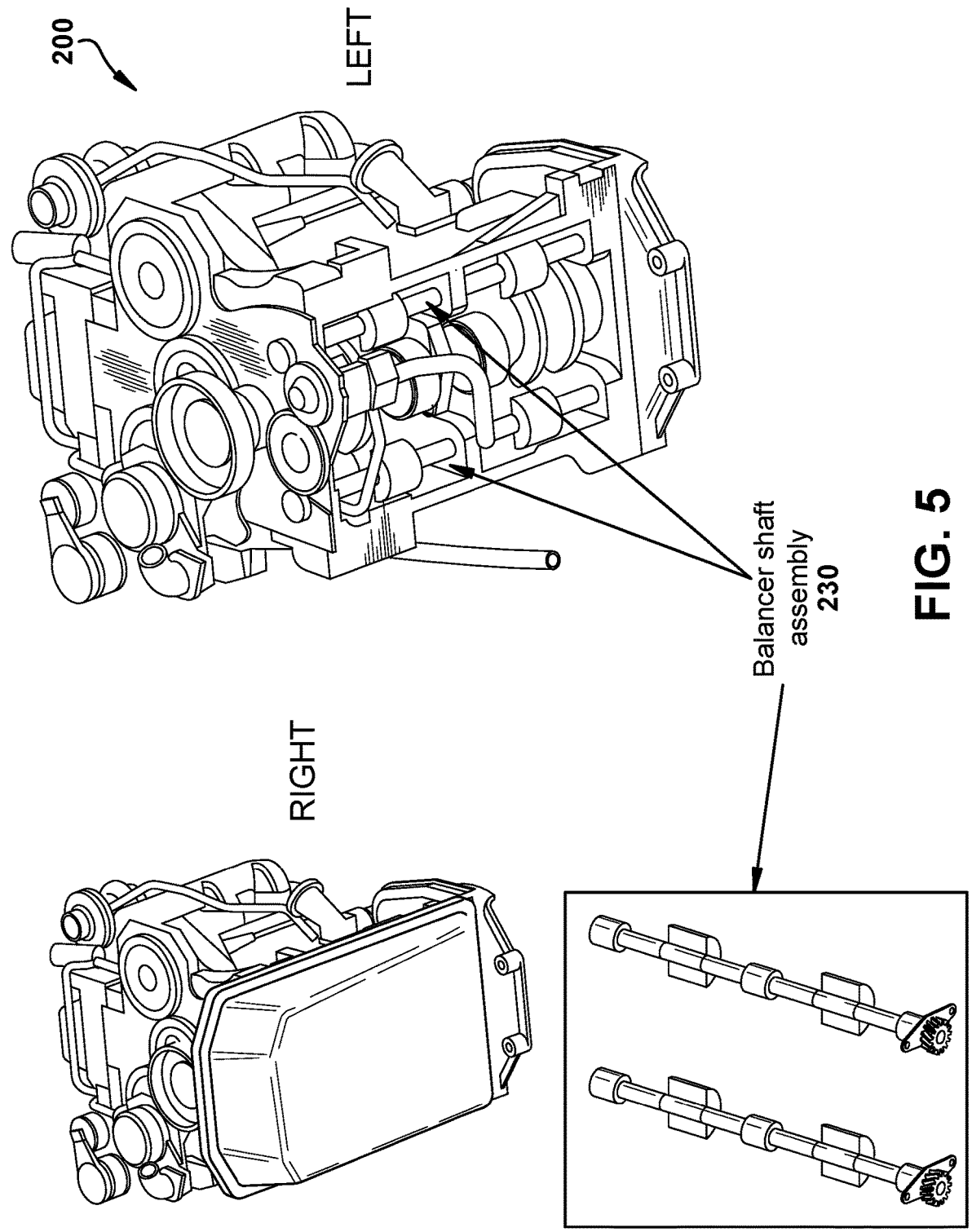
FIG. 5 is a diagram illustrating an example implementation of an engine showing balancer shafts.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The methods and systems disclosed herein, for example, may be suitable for use in different applications, such as for different fluid filter applications and in different types of engines. That is, the herein disclosed examples can be implemented in different engine filter systems other than oil filters for particular vehicles, such as other than for farm vehicles (e.g., tractors).

FIG. 1 is a component diagram illustrating an example implementation of a system that may utilize one or more portions of the aspects and examples described herein. In the implementation illustrated in FIG. 1, a vehicle 100, such as a tractor, can perform different operations, such as a ground working operation in a field. In some implementations, the vehicle 100 has wheels 104, 106 installed thereon. In other implementations, the vehicle 100 has track systems (not shown) instead of wheels installed on the rear or both the front and rear of the vehicle 100.

The vehicle 100 includes a chassis 102, which provides attachment points for the vehicle 100. For example, a work tool (e.g., a bucket, fork, blade, auger, or hammer) can be connected to the front or back of the chassis 102. The work tool is movably connected to the chassis 102 in some examples.

The vehicle 100 further includes a bypass valve having an variable filter as described in more detail herein. In some examples, the variable filter is self-adjusting in response to variable pressure across the bypass valve. As such, one or more examples supply filtered oil bypass flow to one or more main oil galleries of an engine of the vehicle 100, thereby reducing the likelihood of debris flowing to the oil galleries and engine joints that can cause engine damage and/or failure. With the herein described examples, proportionate filtered oil is supplied to oil galleries and joints (e.g., critical joints) during conditions when unfiltered oil supply would otherwise be provided by the bypass valve (e.g., during thick oil conditions or when the filter is clogged). Thus, filtered oil is supplied under more conditions to reduce contaminants passing through the bypass valve.

It should be noted that while various examples are described in connection with a tractor having a particular configuration, the systems and methods described herein may also be utilized with other types of vehicles and implements. For example, the vehicle may comprise another utility-type vehicle, such as a truck, hauler, semi-tractor, or any vehicle that uses an a bypass valve, such as any vehicle with a diesel-powered internal combustion engine. For example, one or more herein described aspects can be implemented in a work vehicle, such as a backhoe loader, but may be any work vehicle with an a bypass valve, such as an articulated dump truck, compact track loader, crawler (e.g., crawler dozer, crawler loader), excavator, feller buncher, forwarder, harvester, knuckleboom loader, motor grader, scraper, skidder, sprayer, skid steer, tractor, tractor loader, and wheel loader, among others. The various examples can also be implemented in other work vehicles, passenger vehicles, or other equipment powered by a diesel engine (e.g., generators, compressors, pumps, and the like).

The vehicle 100 in one example is a diesel-powered vehicle that includes an internal combustion engine 200 as illustrated in FIGS. 2-5. The internal combustion engine 200 is operable using a normal oil flow path and a bypass oil flow path. The internal combustion engine 200 can be used in any work vehicles, passenger vehicles, or other equipment powered by a diesel engine. The internal combustion engine 200 includes a bypass valve 202 having an integrated variable filter 204 (referred to herein as a variable filter 204) as described in more detail herein (see FIGS. 6-13). The variable filter 204 is configured to allow different levels or granularity of filtering of the oil flow therethrough as the bypass valve 202 is moved open with a spring 206, configured as a biasing spring in this example. The variable filter 204 allows for oil flow having different levels of filtering (and/or different levels of flow) to pass through the bypass valve 202 to oil galleries in the internal combustion engine 200. That is, as the bypass valve 202 is opened to different degrees or amounts, different levels of filtering and/or flow are provided by the variable filter 204.

In the illustrated example, an oil reservoir 228 (e.g., oil pan) stores oil used by the internal combustion engine 200, which circulates through main oil galleries 208 (e.g., oil pathways or passages in the internal combustion engine 200) and is used by the internal combustion engine 200 during operation thereof. As can be seen, a housing 210 is provided for receiving and maintaining (e.g., removably securing) an oil filter assembly 212 within the internal combustion engine 200. An oil cooler 214 is also provided having an oil flow path into the oil filter assembly 212 and an oil flow path out of the oil filter assembly 212.

The normal oil flow path and the bypass oil flow path together define a fluid circuit within the internal combustion engine 200. A pump 226 is provided to receive oil at an inlet 232 and draw the oil through an oil suction tube 216 to an outlet 218, which thereby moves oil from the oil reservoir 228 and draws the oil through the oil filter assembly 212. The filtered oil (i.e., the oil that passes through the oil filter assembly 212) is then moved on to different components of the internal combustion engine 200 providing various functions of the vehicle 100 before returning the oil to the oil reservoir 228.

Under normal operating conditions, the oil passes through the normal oil flow path. That is, filtered oil that passes through the oil filter assembly 212 is moved within one or more components or portions of the internal combustion engine 200. When the internal combustion engine 200 is operating within the bypass oil flow path as described in more detail herein, some or all of the oil is diverted or directed with the bypass valve 202, such that the oil does not pass through the oil filter assembly 212. However, as described in more detail herein, the variable filter 204 of the bypass valve 202 performs filtering of the oil that does not pass through the oil filter assembly 212. That is, the variable filter 204 is mounted within the bypass valve 202 and is configured as a variable filtering element to perform, for example, secondary filtering when the primary filtering of the oil filter assembly 212 is bypassed. For example, the variable filter 204 carried within the bypass valve 202 includes the spring 206, which in some examples is carried within a spring housing 220 that includes a spring retainer 222 (see FIG. 9) at one end against which the spring 206 abuts. The other end of the spring 206 abuts against the bypass valve 202.

Thus, during normal operation, the pump 226 serves to draw oil from the oil reservoir 228 through the oil filter assembly 212, which is then moved to the various engine components, and ultimately returned to the oil reservoir 228. However, when the vehicle 100 (e.g., tractor) is first started and the oil is cold, the viscosity of the oil is greater and the oil is thicker, heavier and more dense. As cold oil is drawn from the oil reservoir 228 by the pump 226, the oil tends to flow slowly and does not easily pass through the walls of the filter element(s) of the oil filter assembly 212. Further, larger particles of contaminates in the oil will not easily pass through the walls of the filter element of the oil filter assembly 212. As illustrated in FIGS. 6-9, with continued reference to FIGS. 2-5, during this time (or, for example, when the oil filter assembly 212 is clogged), high suction created by the pump 226 causes a poppet 224 of the bypass valve 202 to open and permit the cold oil to flow through the variable filter 204, and pass through the bypass oil flow path instead of the normal oil flow path.

In the illustrated example, the bypass oil flow path arrows designate the flow path of the cold oil (or oil that is otherwise prevented from passing through the oil filter assembly 212, such as through a clogged filter element), wherein the oil from the oil reservoir 228 flows around, but not through the oil filter assembly 212 because the viscosity of the oil is high. As the suction created by the pump 226 increases, the poppet 224 of the bypass valve 202 opens and permits the cold oil to flow through the bypass valve 202, which passes through the variable filter 204. In one example, the bypass valve 202 and the variable filter 204 are configured to direct oil through the variable filter 204 when the oil pressure is at a predetermined vacuum level (e.g., approximately five pounds per square inch of vacuum). As will be described in more detail herein, as the vacuum level or oil pressure level increases and the poppet 224 of the bypass valve 202 opens more, different levels of the filtering are provided by the variable filter 204. The bypass valve 202 with the variable filter 204 thus serves to allow the cold oil to pass through and be filtered by the variable filter 204 (e.g., bypassing the oil filter assembly 212).

When the oil has warmed sufficiently, the viscosity of the oil drops and the suction created by the pump 226 drops, allowing the poppet 224 of the bypass valve 202 to close. As this occurs, the oil begins to again flow through the walls of the filter element of the oil filter assembly 212. As illustrated by the arrows designating the fluid flow in FIGS. 2-4, the oil is then drawn through the walls of the filter element of the oil filter assembly 212. Thereafter, the pump 226 returns the oil to the oil reservoir 228.

In one example, the bypass valve 202 operates to direct oil to the inlet area of the variable filter 204 when the oil pressure is at a predetermined vacuum level and the poppet 224 opens. As the vacuum level (or pressure) increases and the poppet 224 translates through different partially open states to a fully open state, the variable filter 204 is configured to perform different levels of filtering. That is, at different opening spacings of the poppet 224, different portions of the variable filter 204 are exposed to the oil flow and provide different levels of filtering, such as filtering of debris or other contaminants. In one example, the openings in the variable filter 204 are sized and/or shaped to allow larger sized particles to pass therethrough. As such, as the poppet 224 moves to be more open, the particle size of debris or other contaminants that are filtered by the variable filter 204 increases (e.g., less filtering granularity). For example, the variable filter 204 is configured to filter a range of particle sizes as more or less of the variable filter 204 is exposed to the oil flow through the bypass valve 202 (e.g., from 5 micros to 50 micros to 100 microns, etc.).

Figure 6:
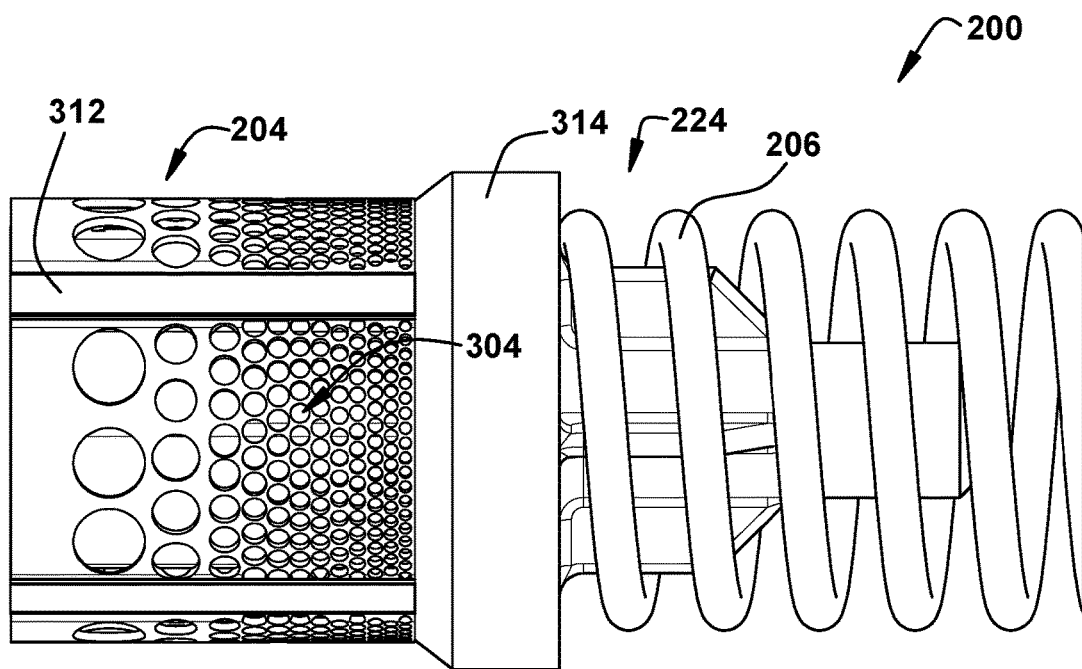
FIG. 6 illustrates a variable filter according to an implementation.
Figure 7:
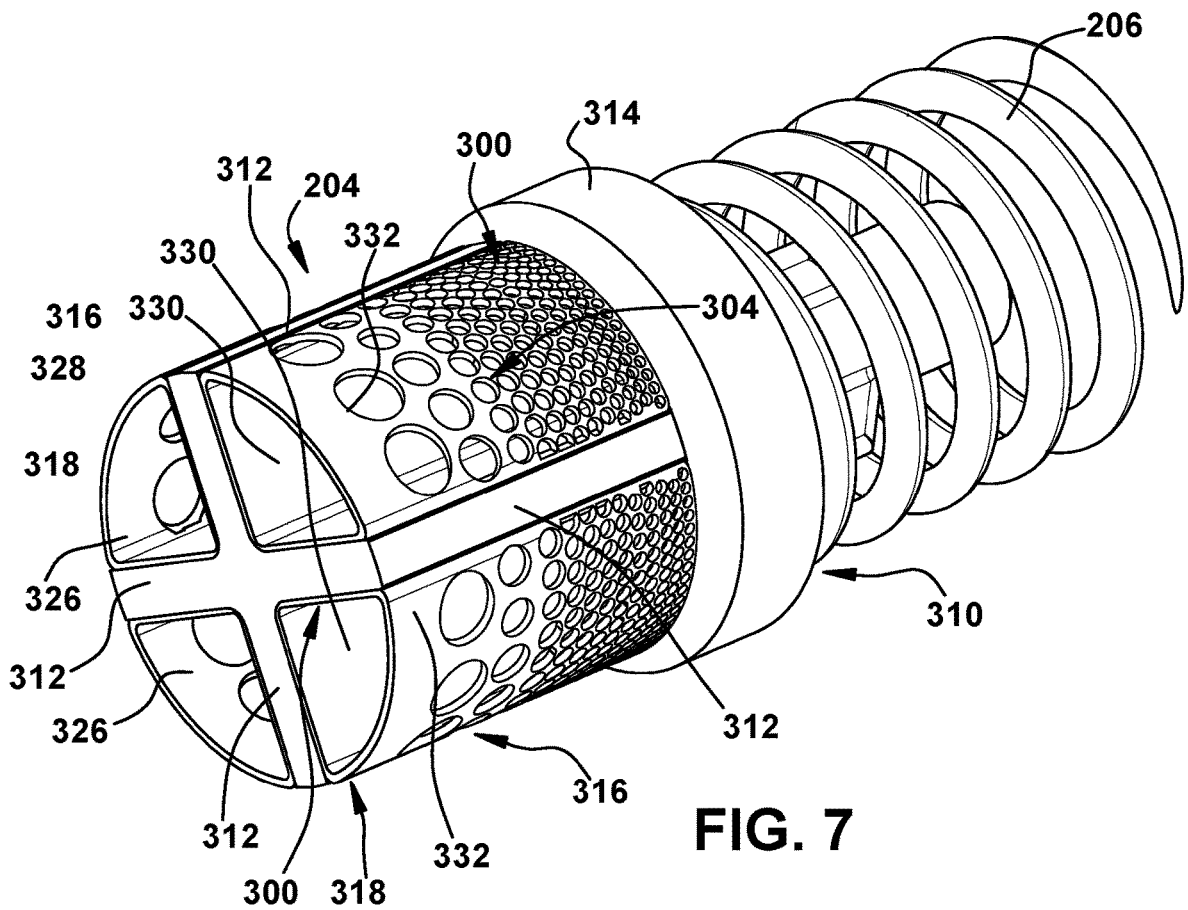
FIG. 7 illustrates another view of the variable filter of FIG. 6.
Figure 8A:
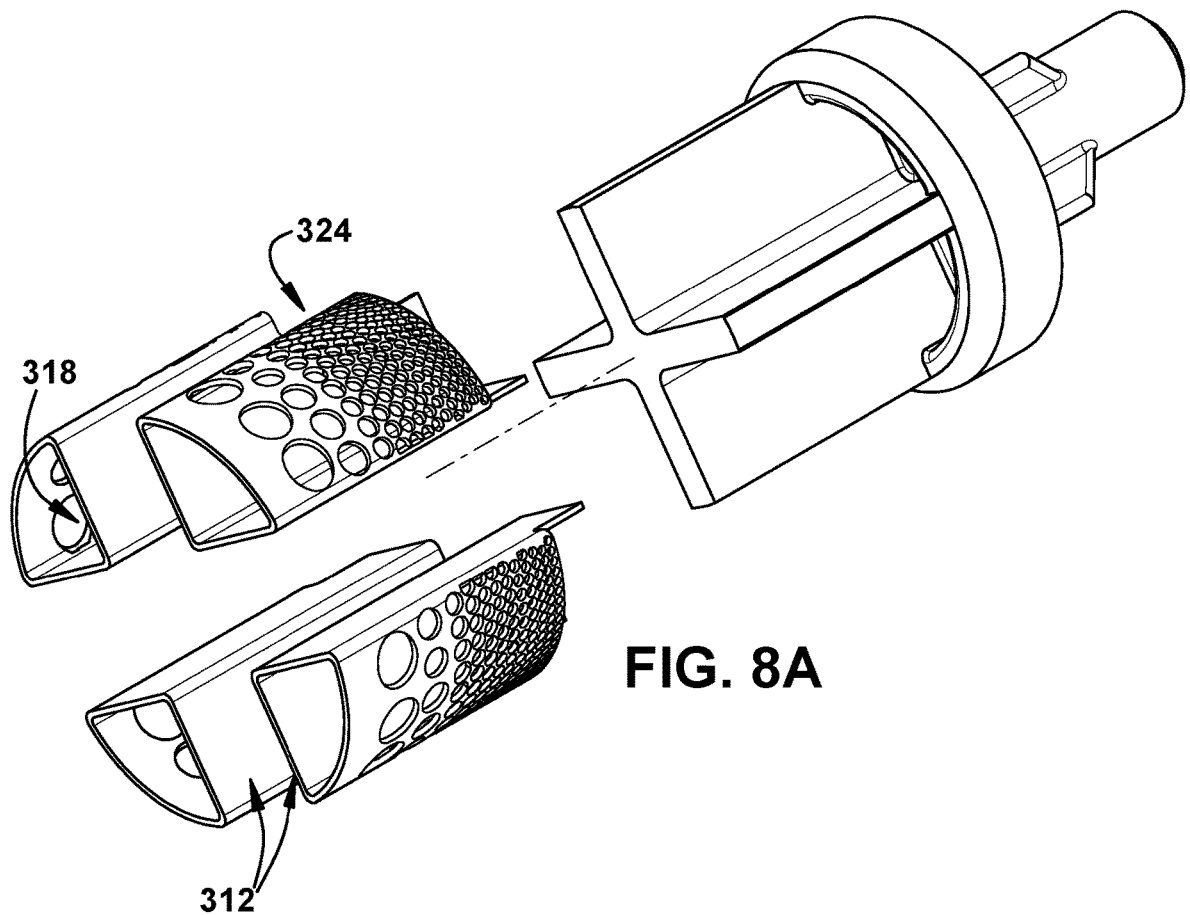
FIG. 8A illustrates a variable filter according to an implementation.
Figure 8B:
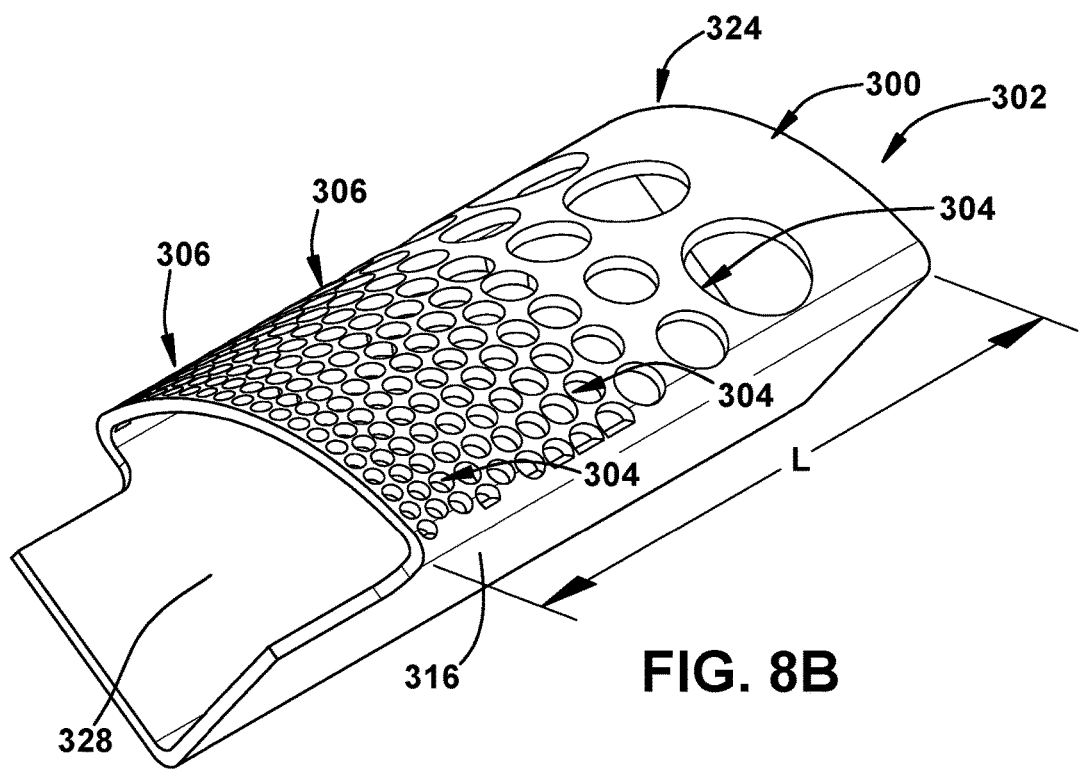
FIG. 8B illustrates a filter element of the variable filter of FIG. 8A.

In one example, as shown in FIGS. 6, 7, 8A, and/or 8B, the variable filter 204 includes one or more filter elements 300 configured to provide varying filtering using a plurality of openings 304 having a varying size (e.g., a varying diameter) along a length (L) of a body 302 of the variable filter 204. The body 302 of the variable filter 204 comprises at least one wall 326, for example, which can be shaped as an annular cylinder, or some other appropriate shape comprising more than one wall (e.g., triangular, square, etc.). The wall comprise an inner surface 330 and an outer surface 332. For example, from one end of the body 302 of the filter element 300 to an opposite end of the body 302 of the filter element 300, the filter element 300 has openings 304 (e.g., or vias), between the inner surface 330 (inside of the 326) and the outer surface 332 (outside of the wall 326). Further, the openings or vias 304 increase in size (e.g., diameter, width, height, area, etc.) in some examples. As can be seen, a plurality of rows 306 of openings 304 are provided with each row 306 having approximately same sized openings 304 and at least some rows (e.g., sub-sets or set of rows 306) having same sized openings 304. That is, one or more rows 306 have openings 304 of the approximately same size and one or more rows 306 have openings 304 of a different size than other rows 306. In some example, the change in size of the openings 304 between one or more rows 306 is the same (e.g., an increase of a defined percentage or amount from one or more rows 306 to one or more other rows 306). However, the change in size of the openings 304 from one row 306 to another row 306 can be varied as desired or needed. Moreover, the openings 304 can be evenly and/or symmetrically spaced in some examples. In other examples, the openings 304 can be unevenly or asymmetrically spaced.

In various examples, the change in the size of the openings 304 is graduated or incrementally changes to provide less filtering (e.g., larger openings) or more flow as more of the variable filter 204 is exposed to the oil flow within the bypass valve 202. That is, the differently sized openings 304 define different levels of filtering, such as from a fine filtering element to a coarser filtering element as the openings 304 increase in size. That is, filter element size varies from one end of the variable filter 204 to another end of the variable filter 204, such as from a fine filtering size to a coarse filtering size. As such, the variable filter 204 is configured to filter varying size oil impurities and/or provide filtering at different flow or pressure levels. It should be noted that the variable filter 204 in some examples filters impurities from other fluids. That is, the variable filter 204 is not limited to application within a system to filter oil.

The size, shape, spacing, configuration, number per row 306, etc. of the openings 304 can be varied as desired or needed. Thus, while the openings 304 are shown as circular in shape, in particular numbers per row 306, and having increasing sizes in a particular arrangement, the configuration of the openings 304 can be changed, such as based on filtering requirements, type of engine, type of oil, etc.

The body 302 of the variable filter 204 is configured to be complementary to the configuration of the bypass valve 202. That is, the body 302 is sized and shaped to conform and/or align with the bypass valve 202 to couple or engage therewith. In the illustrated example, the body 302 is configured as a quarter-shaped filter element to be arranged and fit within a quarter portion of a body 310 of the bypass valve 202. That is, the body 310 defines the structure of the poppet 224 and includes walls 312 (acting as locaters for positioning the body 302 of the variable filter 204 in one example) extending from a base 314 that define four quadrants 316 for receiving therein the variable filter 204. As can be seen, the variable filter 204 is formed from four portions or parts that are separate quarter-cylindrical bodies that are configured to align in abutting relationship within each of the quadrants 316. The quarter-cylindrical bodies are hollow having three solid walls 326 (illustrated as sides acting as guides to be positioned by the walls 312) forming a wedge shape with an extension 328 extending beyond an end of the body 302, an open end 318 opposite the end with the extension 328, and a filter surface 324 that includes the one or more rows 306 of the openings 304 that extends along a length of the variable filter 204 from the open end to the closed end. The filter surface 324 is an outward facing surface and the quarter-cylindrical bodies are arranged within the quadrants 316 such that the open end 318 is facing a direction of incoming oil flow. As such, the oil flow through the bypass valve 202 passes through the hollow quarter-cylindrical bodies and is filtered by the openings 304. Thus, a variable filter bypass assembly is thereby formed. It should be noted that the bodies 302 configured as quarter-cylindrical bodies can be coupled within the quadrants 316 or positioned therein and held in place by placement within the bypass valve 202 and/or by the oil pressure applied thereon. In some examples, the extension is an extended portion of one or more of the walls 326 that is configured to engage and/or maintain the variable filter 204 in the bypass valve 202. That is, the variable filter 204 is held in place with respect to the bypass valve 202 (e.g., locked in position and orientation relative to the bypass valve 202) at least in part by the extension 328. It should be noted that the configuration (e.g., size, shape, number of walls extended, etc.) of the extension 328 can be varied as desired or needed, such as based on the configuration of the bypass valve 202.

Figure 9:
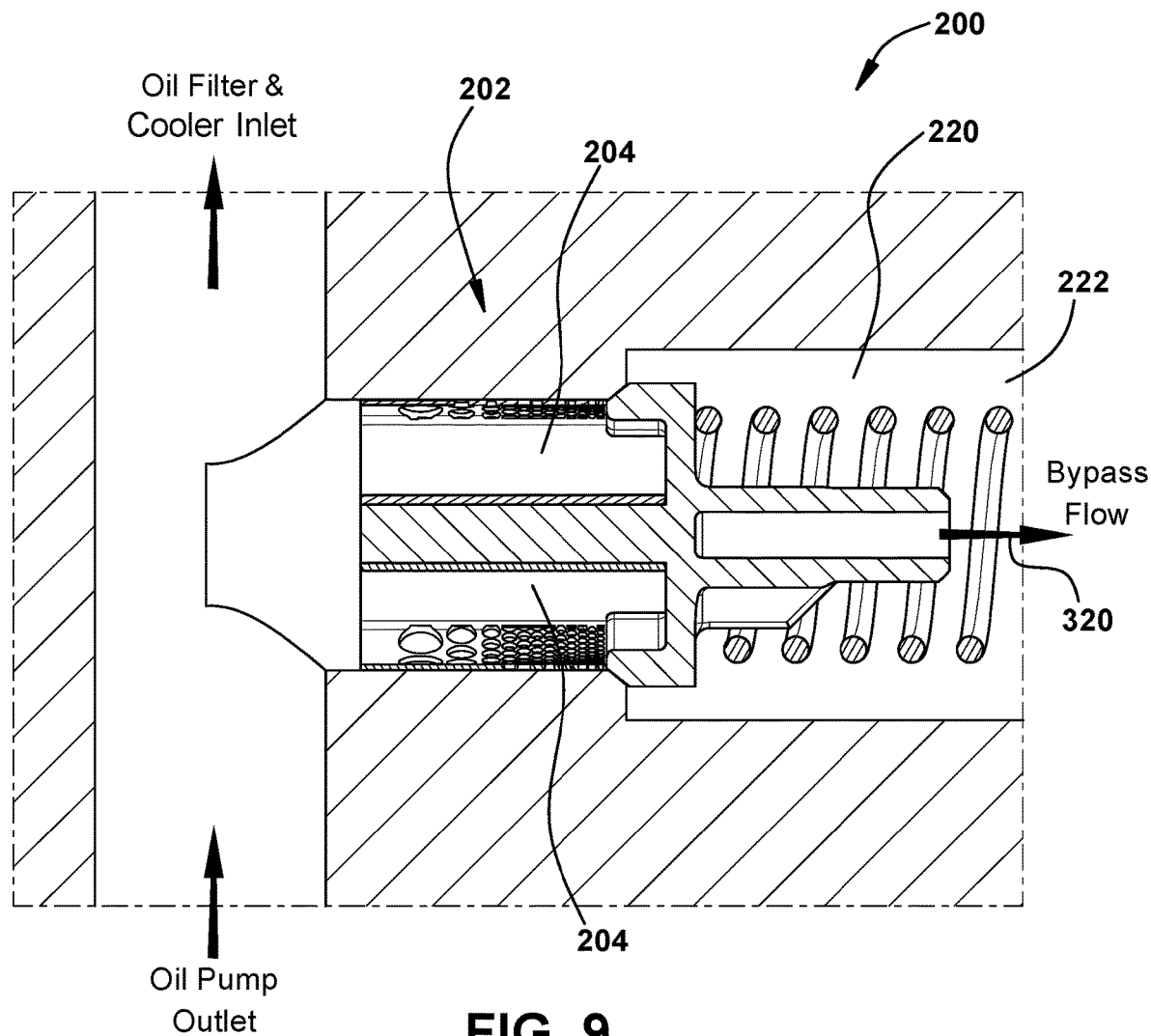
FIG. 9 illustrates the variable filter of FIG. 8A in a bypass valve.

Thus, as can be seen in FIG. 9, the variable filter 204 is movable (e.g., adapted or configured for translation) within the bypass valve 202 and biased in a closed position by the spring 206. The openings 304 of the variable filter 204 are exposed to a bypass flow path 320 within the bypass valve 202 as the variable filter 204 is moved, such as resulting from vacuum pressure or oil pressure as described in more detail herein. That is, as the variable filter 204 translates within the bypass flow path 320, oil flow is allowed through the variable filter 204 and filtered by the openings 304. Under normal operating conditions, the oil exits the oil pump outlet and flows to an inlet of the oil filter assembly 212 and the oil cooler 214 as illustrated by the arrows.

When vacuum pressure increases as described herein, pressure is applied to the bypass valve 202 causing the poppet 224 to move and allow flow through the bypass flow path 320 within the bypass valve 202. The oil flow through the bypass valve 202 is variably filtered as the vacuum pressure changes as described in more detail herein. That is, the bypass valve 202 in various examples provides proportionate filtered oil with a continuous supply of oil through the bypass flow path 320 to engine components depending on the pressure difference across the bypass valve 202. For example, depending on the pressure difference caused by thick oil, filter clogging, and/or high oil pressure, among other causes, the variable pressure is applied on the bypass valve 202 that causes the variable filter 204 to automatically change position as the poppet 224 moves within the bypass valve 202. Thus, the filtering by the bypass valve 202 is self-adjusting in various examples and reduces or eliminates the likelihood of failure of engine critical components (e.g., damage to the balancer shafts of a balancer shaft assembly 230 (shown in FIG. 5) that results in engine failure) in both a filtered unclogged condition, as well as when the oil filter assembly 212 becomes clogged and bypass filtering is provided.

The variable filter 204 can be configured as desired or needed. In some examples, the variable filter 204 is metallic. That is, the variable filter 204 is formed from a metal material that can be cleaned and reused. The variable filter 204 can also be applied to different applications and used with different fluid types, including with different filter and bypass valve sizes.

FIGS. 10A, 10B, 10C, 10D, and 10E illustrate bypass operation of the bypass valve 202 in various examples. As can be seen, under normal flow conditions at 400, the bypass valve 202 is closed. That is, the poppet 224 is biased by the spring 206 to a closed position, thereby blocking the bypass flow path 320. As a result, oil flows through the main engine filter, namely the oil filter assembly 212. As oil pressure increases, the poppet 224 is pressed against the spring 206 at 402 by the force of the increased pressure applied thereto and oil flow begins to flow through the variable filter 204 into the bypass flow path 320. The pressure increase is illustrated as a slightly higher oil pressure, such that the smaller openings 304 of the variable filter 204 are exposed to the oil flow. That is, oil flow is provided through fine filter elements at this pressure level.

As the oil pressure continues to rise, at 404, the poppet 224 is pressed farther against the spring 206 by the increased pressure and more oil flows through the variable filter 204 into the bypass flow path 320. That is, the poppet 224 translates farther within the bypass valve 202 such that more (larger) openings 304 of the variable filter 204 are exposed to the oil flow. The oil flow is now provided through semi-fine filter elements at this pressure level. As the oil pressure rises even more, at 406, the poppet 224 is pressed even farther against the spring 206 by the increased pressure and more oil flows through the variable filter 204 into the bypass flow path 320 (see FIG. 9). That is, the poppet 224 translates farther within the bypass valve 202 such that even more (larger) openings 304 of the variable filter 204 are exposed to the oil flow. The oil flow is now provided through coarse filter elements at this pressure level.

As the oil pressure rises more, at 408, the poppet 224 is pressed even farther against the spring 206 by the increased pressure and more oil flows through the variable filter 204 into the bypass flow path 320. At this pressure, the poppet 224 is moved to a maximum flow condition and prevented from further movement by a stop (not shown). The poppet 224 translates farther within the bypass valve 202 such that even more (larger) openings 304 of the variable filter 204 are exposed to the oil flow. The oil flow is now provided through all of the filter elements at this pressure level, which in some examples provides free flow of oil. That is, with the entire variable filter 204 exposed to the oil flow, normal bypass unfiltered oil flow is thereby provided. It should be noted that at one or more of the different conditions, an alert or warning (e.g., audible or visible alert) is provided to an operator.

Thus, various examples provide a filtered oil supply to engine oil galleries in a bypass valve activation condition. As such, filtered oil is supplied under conditions where the filtered oil would not otherwise be provided and can reduce the likelihood of or prevent engine critical joints from failures. The variable size filter elements of the variable filter 204 with the spring 206 is configured to provide self-adjusting of bypass valve position, for example, based on filter clogging and/or oil pressure. In various examples, the bypass valve 202 ensures no fluttering during peak torque/high-speed condition and in a worst case condition (e.g., all filter elements get clogged), the self-adjusting operation ensures continuous oil supply to the oil galleries.

Figure 11A:
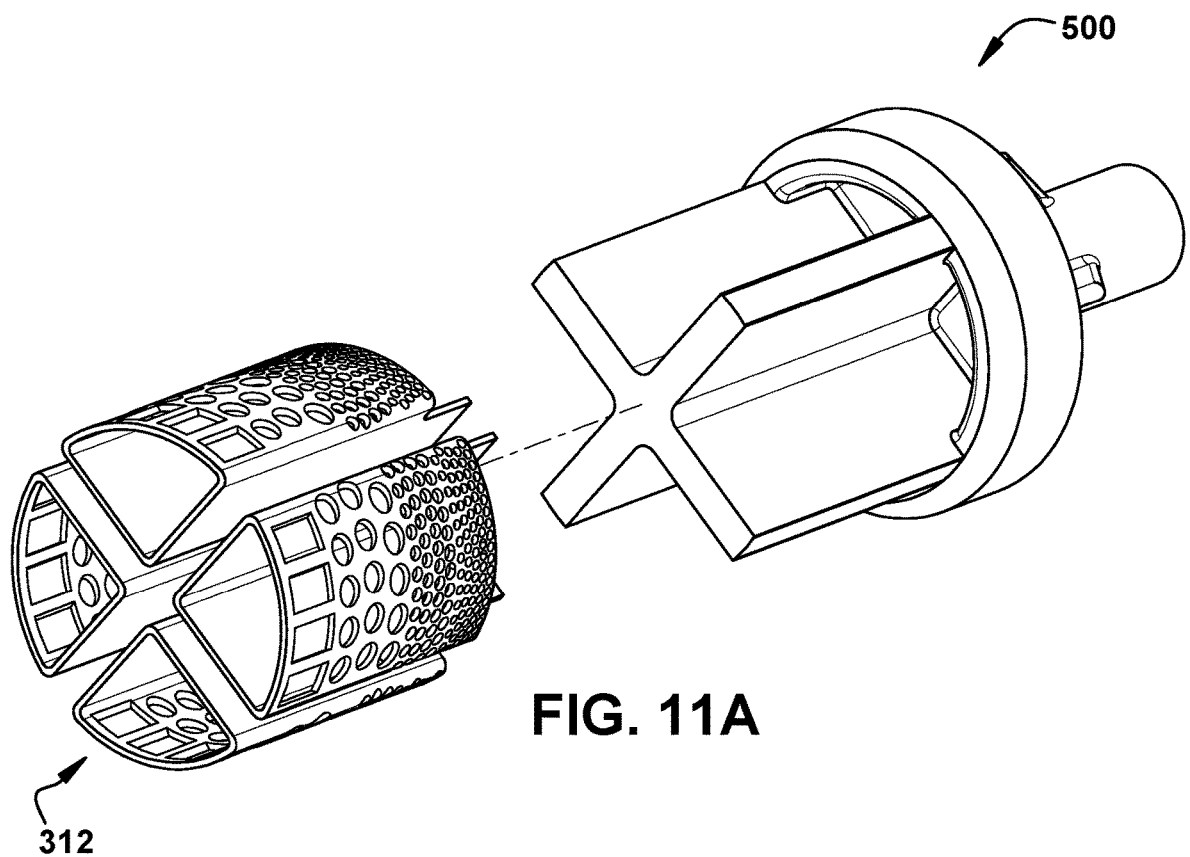
FIG. 11A illustrates a variable filter according another implementation.
Figure 11B:
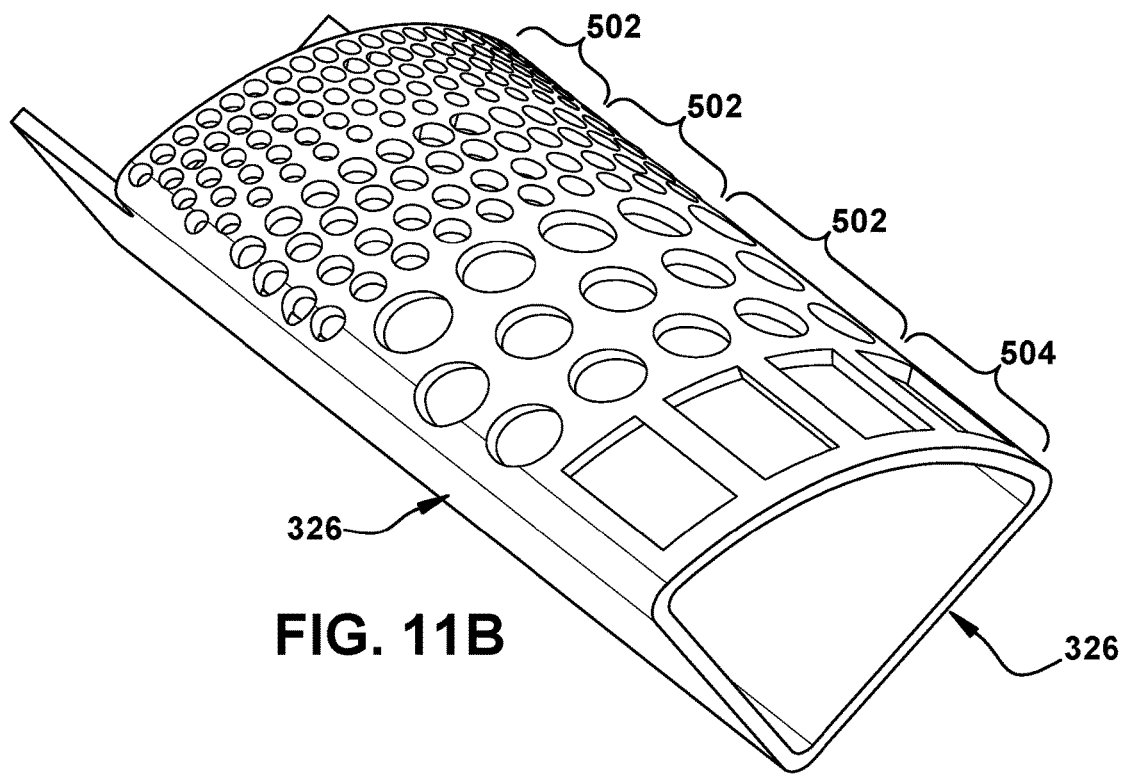
FIG. 11B illustrates a filter element of the variable filter of FIG. 11A.

Variations and modification are contemplated. For example, a variable filter 500 as illustrated in FIGS. 11A and 11B include sets of filter openings 502 having different sizes. That is, a plurality of rows of filter openings 502 in each set of filter openings 502 have the same size, with each set having different sized filter openings 502 from another set of filter openings 502. In this example, the variable filter 500 has bypass openings 504 in addition to the filter openings 502, wherein the bypass openings 504 are exposed during bypass operation as described herein. The bypass openings 504 are significantly larger that the filter openings 502 and have a different shape than the filter openings 502 in this example.

Figure 12:
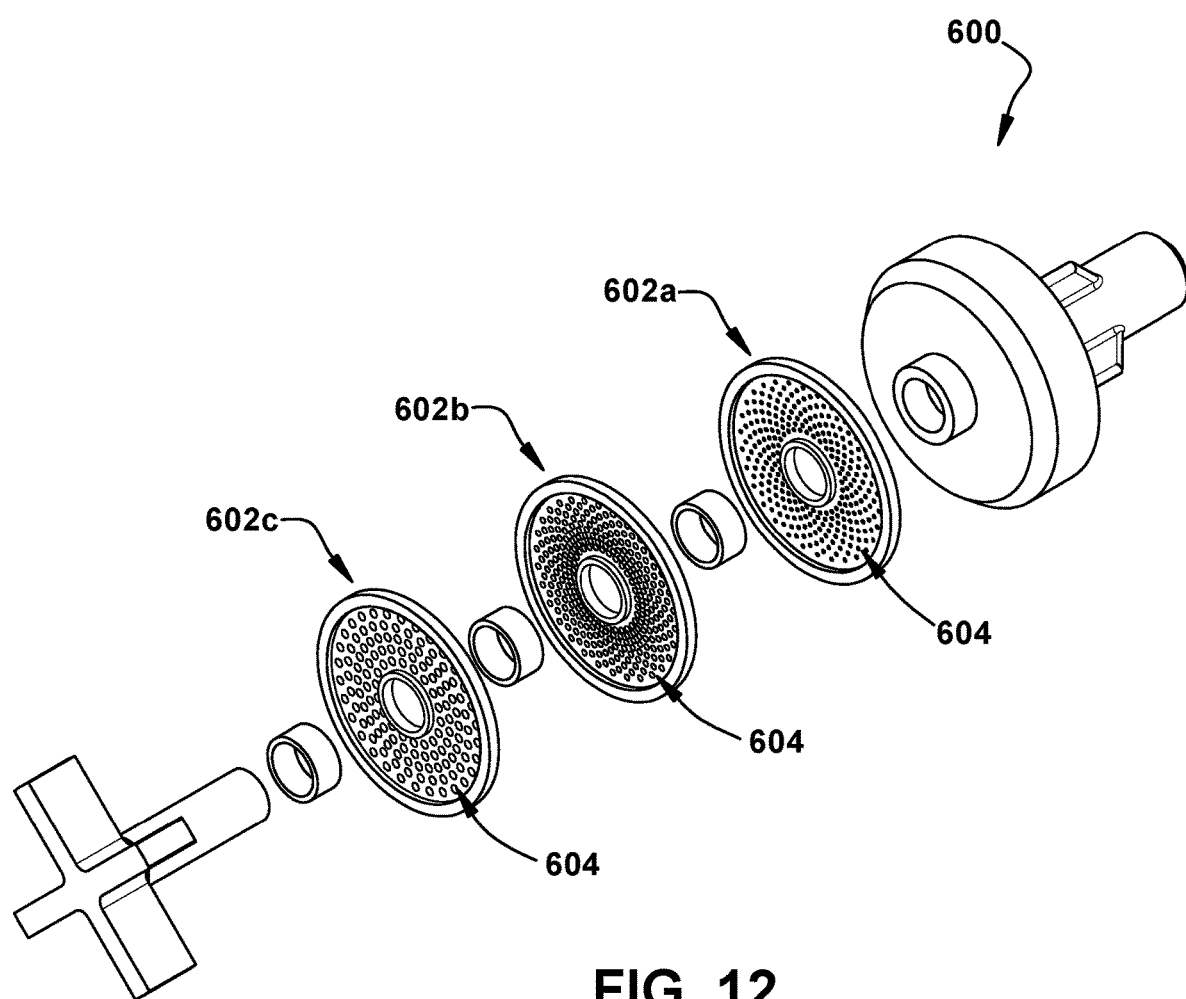
FIG. 12 illustrates a variable filter according another implementation.

As another example, FIG. 12 illustrates a variable filter 600 having a plurality of disc-shaped filter elements 602. In this example, openings 604 in each of the disc-shaped filter elements 602 is different than openings 604 in the other disc-shaped filter elements 602. That is, the size of the openings 604 in the disc-shaped filter elements 602a, 602b, 602c are each different. The disc-shaped filter elements 602 are spaced apart to provide different levels of filtering as each of the successive disc-shaped filter elements 602 is exposed to the oil flow. In the illustrated example, the size of the openings 604 of the disc-shaped filter elements 602 increases along a flow direction of the oil.

Figure 13A:
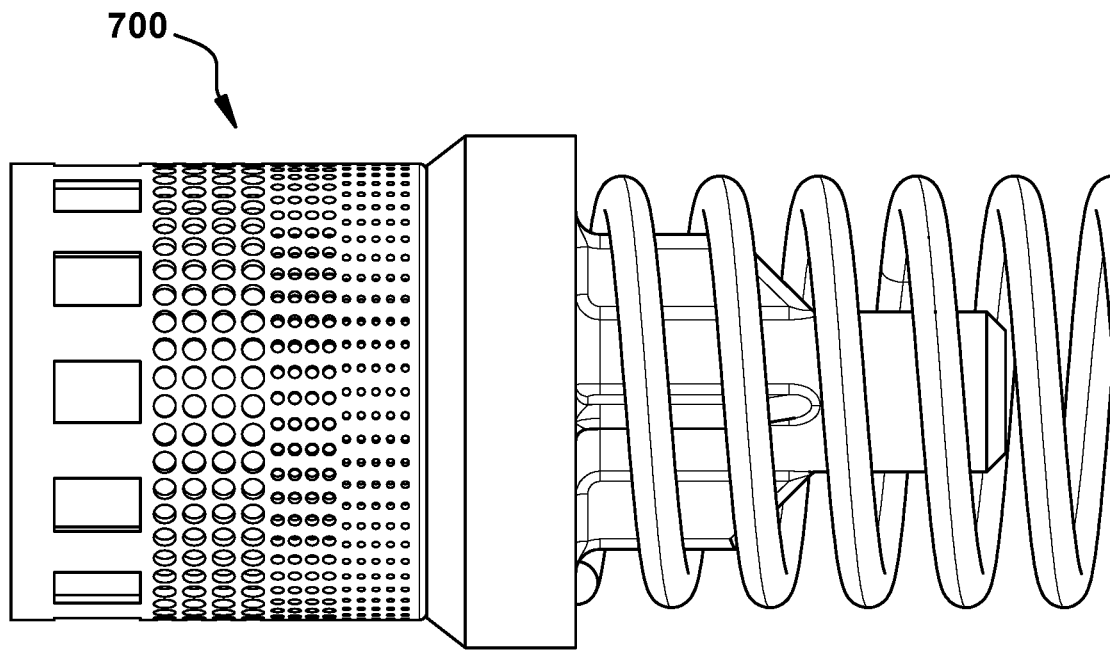
FIG. 13A illustrates a variable filter according another implementation.
Figure 13B:
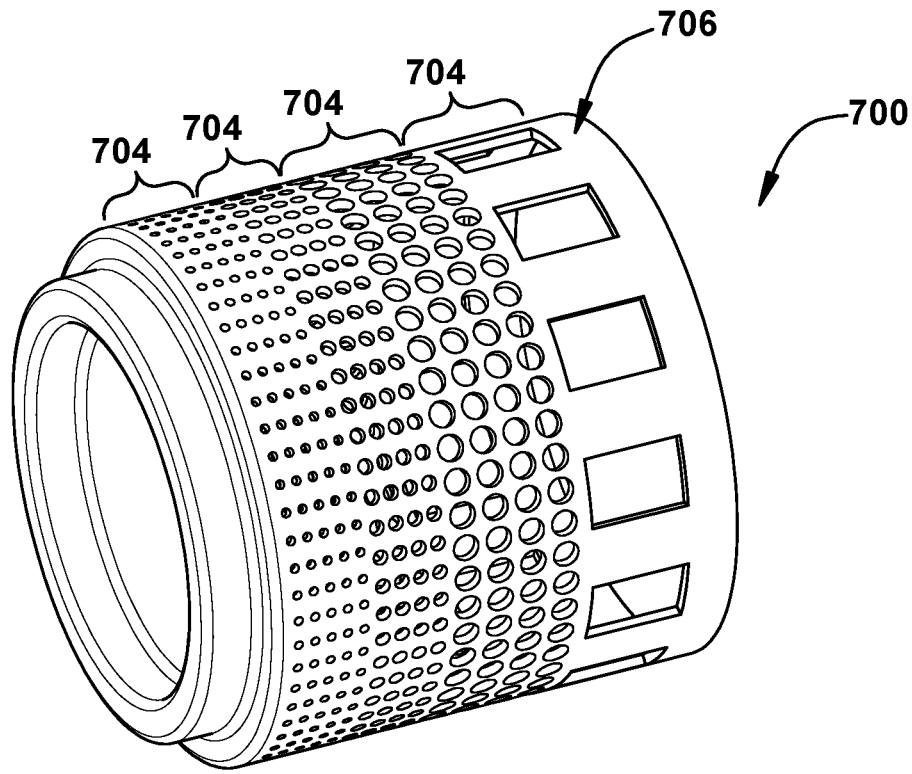
FIG. 13B illustrates a filter element of the variable filter of FIG. 13A.

As another example, FIGS. 13A and 13B illustrate a variable filter 700 having a plurality of filter elements 702 configured as different sized openings. In this example, the variable filter 700 is cylindrical shaped and has a plurality of rows of filter openings 704 in sets of filter openings 704. Each set of filter openings 704 have the same size, with each set having different sized filter openings 704 from another set of filter openings 704. In this example, the variable filter 700 has bypass openings 706 in addition to the filter openings 704, wherein the bypass openings 706 are exposed during bypass operation as described herein. The bypass openings 706 are significantly larger that the filter openings 704 and have a different shape than the filter openings 704 in this example.

Figure 14:
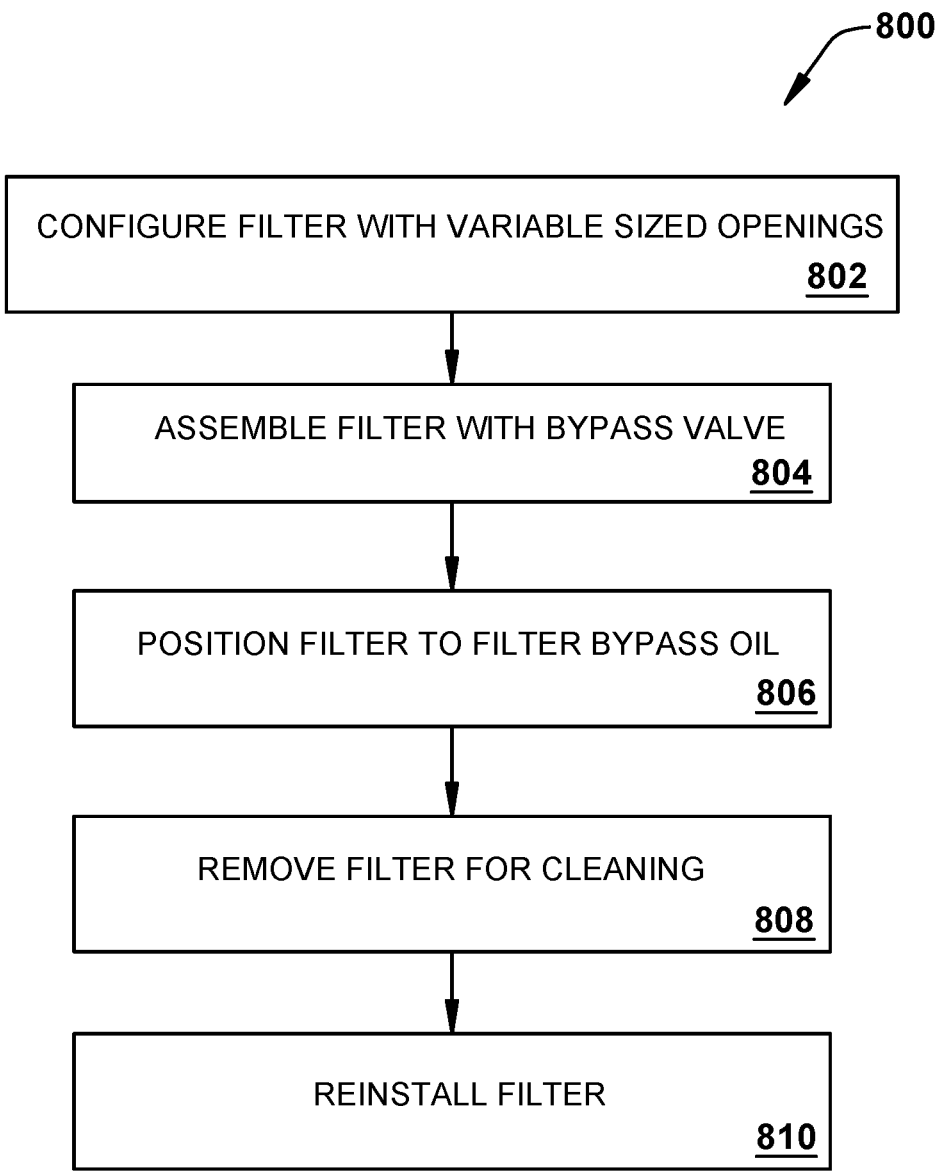
FIG. 14 illustrates an example of a method for filtering bypass oil flow according to one implementation.

A bypass filter assembly is thereby provided and operates to filter bypass oil in various examples. For example, the bypass filter assembly in some examples is self-adjusting to filter oil flow as illustrated in the flowchart 800 of FIG. 14. That is, the flowchart 800 illustrates operations involved in filtering bypass oil flow according to one implementation. In some examples, the operations of the flowchart 800 are performed using the bypass valve 202 having the variable filter 204 as described in more detail herein. The flowchart 800 commences at operation 802, which includes configuring a filter with variable sized openings. For example, as described in more detail herein, the filter is configured to have different sized openings to provide variable filtering of bypass oil flow. The configured filter is assembled with a bypass valve at operation 804. For example, the filter is installed within the bypass valve as described in more detail herein. In some examples, the filter is configured to fit within the bypass valve to allow variable filtering at operation 806. That is, with the bypass valve and filter positioned and/or installed within an engine, bypass oil flow is filtered as described in more detail herein.

At operation 808, the filter is removed for cleaning. That is, the filter is removed from the bypass filter and cleaned (e.g., washed or sanitized). The cleaning in some examples removes debris or other contaminants or build-up from the surface of the filter or from the openings of the filter. The filter is then reinstalled into the bypass valve at operation 810, which again allows for bypass oil filtering using the filter. Thus, the flowchart 800 illustrates a method of variable filtering of bypass oil flow.

While various spatial and directional terms, including but not limited to top, bottom, lower, mid, lateral, horizontal, vertical, front and the like are used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A bypass valve filter comprising:
at least one wall configured such that the at least one wall engages a surface of a bypass valve;
a filter surface having a plurality of openings between an inside of the at least one wall and an outside of the at least one wall, wherein one or more openings of the plurality of openings have a first size, one or more other openings of the plurality of openings have a second size, and one or more of the openings of the plurality of openings have one or more additional sizes wherein the first size is different than the second size and the second size is different than the one or more additional sizes, the first size, the second size, and the one or more additional sizes defining different levels of filtering; and
an open end configured such that the open end allows fluid flow therethrough and to the plurality of openings,
wherein the plurality of openings are arranged in rows and increase in size along a length of the filter surface.

2. The bypass valve filter of claim 1, further comprising a plurality of rows having openings of the first size and a plurality of rows having openings of the second size, wherein the plurality of openings have a circular shape.

3. The bypass valve filter of claim 2, wherein the plurality of openings of the first size define a filter element of a first granularity and the plurality of openings of the second size define a filter element of a second granularity, the first granularity being different than the second granularity.

4. The bypass valve filter of claim 1, wherein the plurality of openings are configured in a plurality of rows, wherein the one or more openings having the first size are in a different row of the plurality of rows than the one or more openings having the second size.

5. The bypass valve filter of claim 1, wherein the plurality of openings comprises a plurality of filter openings and a plurality of bypass openings.

6. The bypass valve filter of claim 1, further comprising a plurality of walls forming a wedge shape and having a closed end opposite the open end.

7. The bypass valve filter of claim 1, wherein the plurality of openings have openings of the first size, the second size, and one or more additional sizes, the plurality of openings arranged in rows and increasing in size, the plurality of openings defining a plurality of filter elements, wherein the plurality of filter elements comprises fine filter elements, semi-fine filter elements, and coarser filter elements.

8. The bypass valve filter of claim 1, wherein the plurality of openings are a same shape.

9. The bypass valve filter of claim 1, further comprising a body having the at least one wall and the filter surface, the body comprising a metal material.

10. The bypass valve filter of claim 1, wherein the fluid comprises oil and the plurality of openings are configured to filter contaminants from the oil during a bypass flow operation.

11. A filter element comprising:
a plurality of walls defining a filter body having a longitudinal axis and a length defined along the longitudinal axis from a closed end to an open end, the plurality of walls having inner and outer surfaces, wherein the plurality of walls have at least three rows, each row having a plurality of openings, wherein the openings of the at least three rows consecutively increase from the closed end to the open end defining varying filter levels; and
an open end configured such that the open end allows fluid flow therethrough and to the plurality of openings,
wherein the filter element reciprocates within an outer housing in a direction along the longitudinal axis.

12. The filter element of claim 11, wherein all the openings in each of the rows of the at least three rows have a same size.

13. The filter element of claim 11, wherein openings in different rows are configured in an offset arrangement between adjacent rows.

14. The filter element of claim 11, wherein at least some rows of the plurality of rows have openings of a first shape, and at least some other rows of the plurality of rows have a second shape, wherein the first shape is different than the second shape.

15. The filter element of claim 11, wherein the plurality of openings incrementally increase along the length of the filter body, the plurality of openings defining incrementally changing filter levels.

16. The filter element of claim 11, wherein the at least one wall has an annular cylindrical shape, and other walls of the plurality of walls define planar surfaces, thereby defining a quarter-cylindrical body.

17. A method of filtering oil in a vehicle, the method comprising:
configuring a variable filter a filter surface with a plurality of rows of openings having different sizes corresponding to different filter levels, the filter surface being outward facing and configured such that the filter surface exposes a varying number of the plurality of rows of openings to a bypass flow path based on a pressure applied on the variable filter; and positioning the variable filter within a bypass valve for filtering fluid in the vehicle.

\* \* \* \* \*